3,555,156
PHENOTHIAZINE COMPOSITIONS AND METHODS OF PREPARING SAME
Boris Kviesitis, Des Moines, Iowa, assignor to VY Lactos Laboratories, Inc., Des Moines, Iowa
No Drawing. Filed Sept. 8, 1964, Ser. No. 395,038
Int. Cl. A61k 27/00
U.S. Cl. 424—247     7 Claims

ABSTRACT OF THE DISCLOSURE

A livestock feed comprising the anthelmintic phenothiazine, and lecithin, propylene glycol, vegetable oil and molasses; and the method of making same wherein an emulsion of the propylene glycol, lecithin and vegetable oil is created to which the molasses and thence the phenothiazine are added wherein the phenothiazine is absorbed into the molasses.

---

This invention relates to a livestock feed and more particularly to a livestock feed having an anthelmintic substance added thereto and to the method of making the same.

It has been recognized that phenothiazine is a typical anthelmintic which is very successful in the eradication of various species of worms which inhabit the intestinal tract of farm animals. It has also been discovered that phenothiazine will prevent horn and face flies from breeding in a treated animal's manure.

Phenothiazine has a taste and odor which is very offensive to livestock and therefore makes it difficult to administer thereto. Attempts have been made to camouflage phenothiazine and other anthelmintic drugs by mixing them with feed products and allowing the animal to partake of the medicinal substance as a part of its regular diet. This method has not proven successful because of the peculiar physical property of phenothiazine and other similar drugs. Phenothiazine is a water insoluble, hydrophobic substance which resists uniform blending with other ingredients. Phenothiazine is biologically active only if it is ground to a micron-size powder. When fine powder of phenothiazine is mixed with other common feed ingredients of coarse texture, it forms a surface coating but which tends to separate therefrom. When an animal detects the phenothiazine or similar substance in its feed, it often will refuse any feed for a time which presents a very serious problem to a farmer. As a practical matter, the above described difficulties in encouraging self-administration of the drug by the animal has resulted in the farmer's forcible administration of the drug to the individual animal. This forcible administration causes the animals to become "off feed" for a time and the drug itself often has a toxic effect upon the animal besides inhibiting the animal's appetite. The forcible administration of the drug to the individual animal is obviously very expensive and time consuming.

It has been recognized that a mixture of phenothiazine or like substances with cane molasses would be desirable towards accomplishing improved palatability of the feed product. However, the inherent adhesive characteristics of liquid molasses made it impractical when it was introduced in sufficient proportion to accomplish its objective.

Therefore, it is a principal object of this invention to describe a livestock feed and a method of making the same which has added thereto an anthelmintic substance.

A further object of this invention is to describe a livestock feed and the method of making the same which prevents excess toxicity from occurring in the stomachs of the livestock consuming the feed.

A further object of this invention is to describe a livestock feed and the method of making the same which has an anthelmintic substance added thereto which is palatable.

A further object of this invention is to describe an anthelmintic substance that livestock will readily consume.

A further object of this invention is to describe an anthelmintic substance which will not adversely affect the appetites of the animals to which it is administered.

A further object of this invention is to describe a method of adding an anthelmintic substance into a feed product that livestock will readily consume.

A further object of this invention is to describe a method of adding an anthelmintic substance into a feed product that the livestock will readily consume which does not impair or destroy the anthelmintic properties of the original product.

A further object of this invention is to describe a method of making a livestock feed comprised of an anthelmintic agent agglomerated on the granules of dried cane molasses which is coated with fine powder of dried cane molasses.

A further object of this invention is to describe a method of making a medicated feed containing an anthelmintic agent and dried molasses where the ingredients are uniformly blended and do not have a tendency to separate from each other.

A further object of this invention is to describe a method of making a medicated feed containing an anthelmintic agent and dried cane molasses which could be compressed to form range blocks with or without a mixture of other ingredients.

A further object of this invention is to describe a livestock feed which prevents the breeding of horn and face flies in the manure of treated livestock.

A further object of this invention is to provide a livestock feed which will be self-administered by the particular animal.

A still further object of this invention is to describe a livestock feed that is economical of manufacture.

All of the stated objectives were accomplished in each of the following examples:

EXAMPLE NO. 1

One part of propylene glycol, one part of soy oil, and one part of lecithin were mixed in a conventional blender to form an emulsion. Approximately 1,050 lbs. of granulated dried molasses were placed in a batch-type mixer and approximately 40 lbs. of the above described emulsion were added thereto. This mixture was agitated for approximately five minutes until the particles of dried cane molasses were coated with the emulsion. Approximately 540 lbs. of phenothiazine powder was then added to the mixture and the mixing was continued for another five minutes. At the end of this mixing, the phenothiazine powder is absorbed by the emulsion thereby forming agglomerates with the particules of dried molasses. At this point in time the phenothiazine is absorbed by the molasses. Approximately 370 lbs. of powdered cane molasses was then added to the mixture and the mixing was continued for another five minutes. At the end of this mixing period, the agglomerates were coated with fine powder of dried molasses. A non-caking agent such as tricalcium phosphate, kaolin, calcium stearate, starch, etc., can be added to prevent the product from caking. The final product is highly palatable, biologically active, granulated and in a free flowing form.

EXAMPLE NO. 2

An emulsion of propylene glycol, soy oil and lecithin was prepared according to the methood described in Example No. 1. Approximately 1,050 lbs. of granulated dried cane molasses were placed in a batch-type mixer and approximately 40 lbs. of the above described emulsion was added thereto. This mixture was agitated for approximately five minutes until the particles of dried molasses were coated with the emulsion. Approximately 540 lbs. of phenothiazine powder was then added to the mixture and the mixing was continued for another five minutes. At the end of this mixing period, the phenothiazine powder was absorbed by the emulsion thereby forming agglomerates with the particles of dried molasses. At this point in time, the phenothiazine is absorbed by the molasses. Approximately 20 lbs. of the above described emulsion was then sprayed on the surface of the agglomerates by means of spray nozzles, a pipeline and a volumetric pump. The mixing was then continued and approximately 350 lbs. of dried cane molasses was added to the mixture and the mixing was continued for another five minutes. At the end of this mixing period, the agglomerates were coated with fine powder of dried molasses thereby forming a palatable film on the particles of the product. A non-caking agent can be added to the mixture if so desired as described in Example No. 1.

EXAMPLE NO. 3

An emulsion of propylene glycol, soy oil, and lecithin was prepared according to the method described in Example No. 1. Approximately 520 lbs. of granulated dried cane molasses was placed in a batch-type mixer and approximately 40 lbs. of the above described emulsion was added thereto. This mixture was agitated for approximately five minutes until the particles of dried molasses were coated with the emulsion. Approximately 1,080 lbs. of phenothiazine powder was then added to the mixture and the mixing was continued for another five minutes. At the end of this mixing period, the phenothiazine powder was absorbed by the emulsion thereby forming agglomerates with the particles of dried molasses. At this point in time, the phenothiazine is absorbed by the molasses. Approximately 350 lbs. of powdered dried molasses was then added to the mixture and the mixing was continued for another five minutes. At the end of this mixing period, the agglomerates were coated with a fine powder of dried molasses. A noncaking agent can be added to this mixture if so desired.

EXAMPLE NO. 4

A product comprised of phenothiazine, dried cane molasses and emulsifying agent was prepared and treated according to the methods described in Example 1, 2 or 3. Approximately 725 lbs. of a trace mineral salt was placed in a batch-type mixer and approximately 10 lbs. of water was added to the salt and mixed for approximately two minutes. Approximately 265 lbs. of the phenothiazine, dried cane molasses and emulsifying agent product described above was then added and the mixing continued for five minutes. At the end of this mixing period, the resulting product was conveyed to a conventional block press and then compressed in range blocks of approximately 50 lbs. each. Many attempts of making range blocks of similar composition containing salt, dried or liquid molasses, and phenothiazine, were unsuccessful when the treatment as described in this example was not utilized.

EXAMPLE NO. 5

A mixture comprised of phenothiazine, dried cane molasses and emulsifying agent was prepared and treated according to the methods described in Example 1, 2 or 3. Approximately 1,490 lbs. of granulated dried molasses, 330 lbs. of salt, 140 lbs. of phenothiazine, 20 lbs. of emulsifying agent, and 20 lbs. of water were placed in a batch-type mixer and agitated for five minutes. At the end of this mixing period, the resulting product was conveyed to a conventional block press and then compressed in range blocks of approximately 33⅓ lbs. each.

A further formulation of this invention is to add 1 part by weight of said emulsion to approximately 13–26 parts by weight of molasses, and then to add 1 to 2 parts by weight of phenothiazine to 2 parts by weight of the resulting mixture. Added molasses may be added in the ratio of 1 part added molasses to 4 parts of the previously described emulsion-coated molasses. If trace mineral salt and water are added to this formulation as suggested in Example 4, the corresponding parts by weight of trace mineral salt and water would be 18 and ¼ respectively.

While many more examples could be cited with a variety of feeds, it should be noted that the emulsion of propylene glycol, vegetable oil and lecithin is common to all of the examples. Dried cane molasses and phenothiazine are slightly soluble in propylene glycol but are miscible at any proportion without forming lumps or cakes. The propylene glycol acts as a carrying agent for the molasses and phenothiazine without totally dissolving the same. Lecithin is added because of its surfactant properties which make it possible to use soy oil or vegetable oil to emulsify phenothiazine and to bind it to the particles of dried molasses.

While the foregoing examples describe the most desirable proportions and ingredients whereby the most desirable results are obtained, it is possible to vary these proportions and ingredients somewhat. The lecithin can be substituted with an edible type of commercial surface agents such as monoglyceride and diglyceride of the fatty acids, sorbitan monostearate and similar materials. The propylene glycol could be substituted with a dipropylene glycol or glycerine, neither of which is as satisfactory as the propylene glycol. Animal fat could be substituted for the vegetable oil.

The addition of noncaking agents as previously described insure that the feed will not cake in storage. Such noncaking of feed permits easy handling and feeding thereof.

While the invention describes the coating of a dried molasses with a phenothiazine film, it is conceivable that processes similar to those herein described could be used during the manufacture of the dried molasses or phenothiazine so that the finished product thereof incorporated a coating thereon or was impregnated with a similar emulsion as herein described.

The resulting livestock feed successfully combats intestinal worms in the animal and prevents face and horn flies from breeding in a treated animal's manure.

I claim:
1. A method of making a livestock feed, comprising:
combining substantially equal parts by weight of lecithin, propylene glycol and vegetable oil to form an emulsion,
mixing 13 to 26 parts by weight of dried molasses with one part by weight of emulsion,
then mixing 1 to 2 parts by weight of phenothiazine powder with 2 parts by weight of said resulting mixture until said phenothiazine powder is absorbed into said dried molasses.

2. The method of claim 1 wherein 1 part by weight of an additional quantity of molasses is added based upon 4 parts by weight of said resulting mixture of emulsion and said first mentioned molasses.

3. The method of claim 1 wherein said vegetable oil is soy oil.

4. The method of claim 2 wherein approximately 18 parts by weight of a trace mineral salt is mixed with approximately ¼ part by weight of water, thence mixing said trace mineral salt-water mixture with the said resulting mixture of emulsion, said first-mentioned molasses, said phenothiazine powder, and said additional quantity of molasses, and thence compressing the mixture into range blocks.

5. A livestock feed product comprising:
a quantity of granulated particles of dried molasses, said particles having an emulsion coating including substantially equal parts by weight of vegetable oil, propylene glycol and lecithin,
said particles being impregnated with phenothiazine, with said phenothiazine being absorbed into said dried molasses,
the respective proportions of dried molasses, emulsion and phenothiazine being approximately 13–26:1:7–27 parts by weight.

6. The feed product of claim 5 wherein said products is coated by additional molasses in the equivalent proportions of 1 part by weight of additional molasses to 4 parts by weight of said-mentioned molasses coated with said emulsion.

7. The feed product of claim 5 wherein said emulsion coating includes substantially equal parts by weight of propylene glycol, lecithin and soy oil.

References Cited

UNITED STATES PATENTS

| | | | |
|---|---|---|---|
| 2,840,504 | 6/1958 | Vierling | 167—53 |
| 3,000,784 | 9/1961 | Todd | 424—247 |
| 3,288,676 | 11/1966 | Kauzal | 167—53 |
| 3,071,507 | 1/1963 | Vierling | 167—53 |
| 3,361,627 | 1/1968 | Campbell | 167—53 |

SAM ROSEN, Primary Examiner

U.S. Cl. X.R.

424—361